May 19, 1925.  1,538,294
L. LUMIERE
PROCESS OF NITRATING REGENERATED CELLULOSE FILMS OR PAPER
Filed April 4, 1924
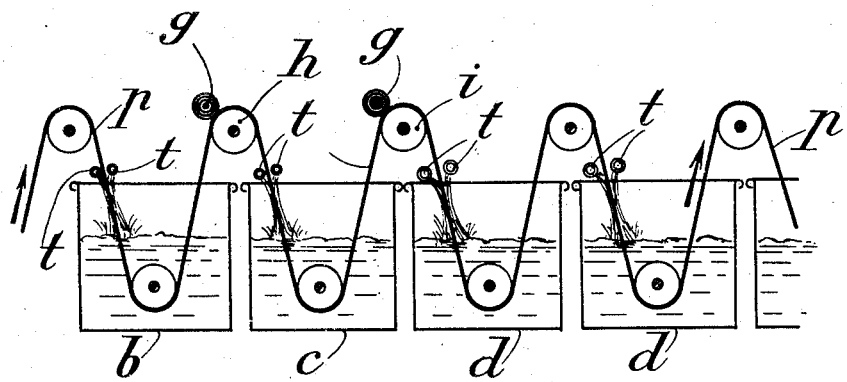
Inventor:
Louis Lumiere Patented May 19, 1925.

1,538,294

UNITED STATES PATENT OFFICE.

LOUIS LUMIÈRE, OF LYON, FRANCE, ASSIGNOR TO SOCIETE ANONYME "UNION PHOTOGRAPHIQUE INDUSTRIELLE, ETABLISSEMENTS LUMIERE & JOUGLA REUNIS," OF LYON, FRANCE.

PROCESS OF NITRATING REGENERATED CELLULOSE FILMS OR PAPER.

Application filed April 4, 1924. Serial No. 704,254.

*To all whom it may concern:*

Be it known that I, LOUIS LUMIÈRE, residing at Lyon, France, a citizen of the French Republic, have invented a certain new and useful Process of Nitrating Regenerated Cellulose Films or Paper, of which the following is a specification.

Films or pellicles of regenerated cellulose known as "cellophane" are employed for various uses but this kind of film cannot be used in photography for the principal reason that it lengthens very appreciably when immersed in a liquid.

The present invention relates to a process for the nitration of such cellophane films for the purpose of transforming them without modifying their appearance or their transparency into nitro-cellulose films available for use in photographic processes and having the same characteristics as those manufactured by the means known at present. This process of nitration is essentially characterized by the fact that the cellophane film is treated successively with nitric acid and sulphuric acid, whereas in the known processes the nitration is effected by nitric acid and the sulphuric acid mixed together.

In the improved process either successive baths of nitric and surphuric acid are employed through which the cellophane film passes or the film is treated with successive affusions of these two acids.

The attached diagrammatic drawing illustrates an example of an installation, in which either method can be used.

The cellophane film $p$ passes in the first place into a bath of nitric acid at 40° Baumé for example, contained in a tank $b$, then over a conveyor roller $h$ and then passes into a bath of sulphuric acid at for example 66° Baumé contained in a second tank $c$ situated adjacent the first. On leaving the latter tank the film is washed by passing it through one or more tanks $d$ containing pure water and then if required through alkaline water and finally again through pure water. Instead of being used in the form of baths the nitric and sulphuric acids as well as the washing liquids can be distributed regularly on the two faces of the cellophane film by perforated tubes $t$, $t$ which respectively spray the two acids and the washing waters through a multitude of jets on to the film. The acids fall to the bottoms of the tanks $b$ and $c$ and are finally recovered.

If necessary, drying rollers $g$ could be arranged in combination with the conveyor roller $h$, $i$ for the purpose of removing the excess of acid from the film passing between them.

When it is required to prolong the duration of contact of the cellophane film either with the nitric acid or with the sulphuric acid several successive tanks or distributors could be used for the acid.

The regenerated cellulose film is impregnated firstly with nitric acid without undergoing any appreciable transformation and it is only the dehydrating action of the sulphuric acid which causes the nitration. Consequently the excess of nitric acid in the first bath remains unaltered and can be continued to be used without loss until exhaustion. Only the sulphuric acid requires regenerating, which can be easily effected.

The process is consequently very economical since it provides for the manufacture of nitro-cellulose films without the necessity of using costly solvents as the manufacture hitherto adopted requires.

The film finished, washed, and dried may be found to have an opalescent appearance which can be easily removed by passing it through a chamber containing vapours of a solvent of nitro-cellulose, acetone for example.

Finally it is possible to obtain thick pellicles by successively sticking together several films by means of acetone, acetate amil or any other suitable solvent, the latter may also contain a dissolved plasticitant, camphor for example.

The process can be employed for the nitration of paper in view of its utilization in the manufacture of celluloid and collodions.

The concentrations of the nitric and sulphuric acids can vary within a certain limit according to the results to be obtained.

What I claim as my invention and desire to secure by Letters Patent of the United States is:—

1. Process of nitrating regenerated cellulose films consisting in impregnating the film with nitric acid, treating the film thus impregnated with sulphuric acid and then washing and drying the film.

2. Process of nitrating regenerated cellulose films consisting in impregnating the film with nitric acid, treating the film thus impregnated with sulphuric acid washing and drying the film and then passing it through a chamber containing vapours of a solvent of nitro-cellulose.

3. Process of nitrating regenerated cellulose films consisting in subjecting the film to successive and alternate washings of nitric and sulphuric acids, then washing the film in water and drying same.

4. Process of nitrating regenerated cellulose films consisting in subjecting the film to successive and alternate washings of nitric and sulphuric acids, washing the film in water, washing in an alkaline solution, again washing in water, drying and then treating the film with vapours of a solvent of nitro cellulose.

In witness whereof I have signed this specification.

LOUIS LUMIÈRE.

Witnesses:
CYRUS B. FOLLMER,
L. ESCHER.